(12) United States Patent
Ueda et al.

(10) Patent No.: US 8,838,337 B2
(45) Date of Patent: Sep. 16, 2014

(54) VEHICLE AUTOMATIC STEERING CONTROL APPARATUS

(71) Applicants: Nippon Soken, Inc., Nishio (JP); Denso Corporation, Kariya (JP)

(72) Inventors: Yusuke Ueda, Nishio (JP); Motonori Tominaga, Anjo (JP); Tomohiko Tsuruta, Aichi-ken (JP); Takeshi Hatoh, Nagoya (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 0 days.

(21) Appl. No.: 13/747,911

(22) Filed: Jan. 23, 2013

(65) Prior Publication Data

US 2013/0197758 A1 Aug. 1, 2013

(30) Foreign Application Priority Data

Jan. 27, 2012 (JP) ................. 2012-015698

(51) Int. Cl.
*A01B 69/00* (2006.01)
*G05D 1/00* (2006.01)
*G06K 9/00* (2006.01)
*B60Q 1/00* (2006.01)
*G05D 1/02* (2006.01)
*B62D 15/02* (2006.01)

(52) U.S. Cl.
CPC ............ *G05D 1/0088* (2013.01); *G05D 1/0212* (2013.01); *B62D 15/025* (2013.01)
USPC .................. 701/41; 701/1; 382/104; 340/435

(58) Field of Classification Search
CPC ............ B60T 2201/08; B60T 8/17557; B60T 8/17558; B60W 30/12; B60W 40/04; Y10S 707/92; B62D 15/025; B62D 15/029; B62D 1/28
USPC .......................... 701/41, 1; 340/435; 382/104
See application file for complete search history.

(56) References Cited

U.S. PATENT DOCUMENTS 6,053,268 A * 4/2000 Yamada ..................... 180/167
6,823,241 B2 * 11/2004 Shirato et al. ................ 701/1
(Continued)

FOREIGN PATENT DOCUMENTS

| JP | 2000-251171 | 9/2000 |
| JP | 2001-048036 | 2/2001 |

(Continued)

OTHER PUBLICATIONS

Office Action issued Feb. 12, 2014 in corresponding JP Application No. 2012-015698 (with English translation).

*Primary Examiner* — Thomas G Black
*Assistant Examiner* — Tyler Paige
(74) *Attorney, Agent, or Firm* — Harness, Dickey & Pierce, PLC

(57) ABSTRACT

A vehicle control apparatus that for automatic steering control that reduces occupant discomfort and stress is provided. A lane width of a subject lane and a current in-lane ratio are detected. If an off-lane obstacle which may place stress on the occupant is present within a prescribed area, a relative position between each off-lane obstacle and the vehicle is determined. A target in-lane ratio is determined based on the relative position. Specifically, when the off-lane obstacles are present on both the left and right sides of the subject lane, the target in-lane ratio is such that lateral distances to both off-lane obstacles are equal. When the off-lane obstacle is present on only one of either the left or right of the subject lane, the target in-lane ratio is set such that a lateral position away from the off-lane obstacle by a lateral distance set in advance is the target lateral position.

18 Claims, 16 Drawing Sheets

(56) References Cited

U.S. PATENT DOCUMENTS

| | | | |
|---|---|---|---|
| 7,136,755 B2* | 11/2006 | Yamamura | 701/301 |
| 7,236,884 B2* | 6/2007 | Matsumoto et al. | 701/300 |
| 7,656,310 B2* | 2/2010 | Obradovich | 340/903 |
| 7,698,032 B2* | 4/2010 | Matsumoto et al. | 701/36 |
| 7,746,221 B2* | 6/2010 | Jung | 340/435 |
| 7,809,506 B2* | 10/2010 | Kuge et al. | 701/301 |
| 7,890,231 B2* | 2/2011 | Saito et al. | 701/41 |
| 2007/0165910 A1* | 7/2007 | Nagaoka et al. | 382/104 |
| 2007/0233343 A1* | 10/2007 | Saito et al. | 701/41 |
| 2008/0055114 A1* | 3/2008 | Kim et al. | 340/937 |
| 2008/0080740 A1* | 4/2008 | Kaufmann | 382/104 |
| 2009/0157247 A1* | 6/2009 | Sjogren et al. | 701/23 |
| 2009/0171533 A1 | 7/2009 | Kataoka | |
| 2011/0187515 A1 | 8/2011 | Saito et al. | |
| 2012/0319869 A1* | 12/2012 | Dorfmann et al. | 340/945 |

FOREIGN PATENT DOCUMENTS

| | | |
|---|---|---|
| JP | 2007-022134 | 2/2007 |
| JP | 2007-326447 | 12/2007 |
| JP | 2010-018062 | 1/2010 |
| JP | 2010-070069 | 4/2010 |

* cited by examiner

LANE RETAINING CONTROL

FIG. 10  IN-LANE RATIO CALCULATING PROCESS

IN-LANE RATIO CALCULATING PROCESS

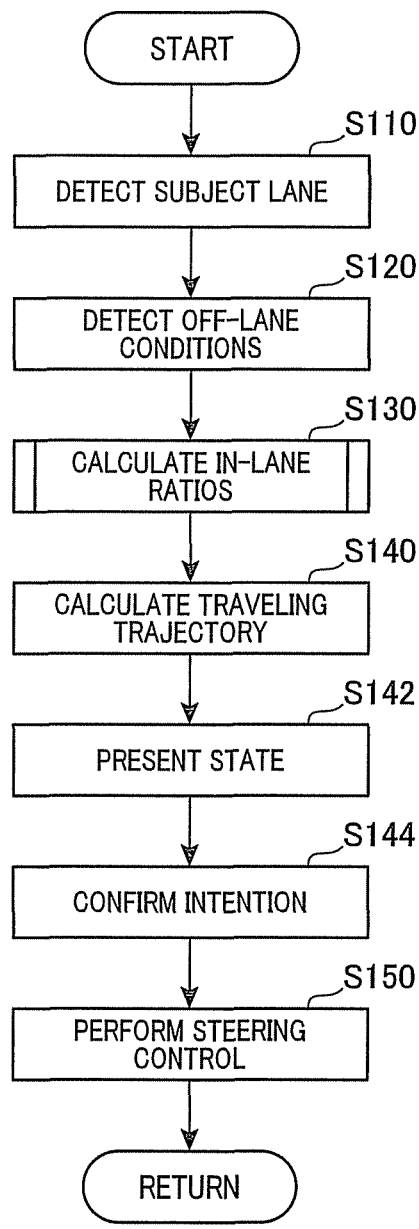

VEHICLE AUTOMATIC STEERING CONTROL APPARATUS

CROSS-REFERENCE TO RELATED APPLICATION

This application is based on and claims the benefit of priorities from earlier Japanese Patent Application No. 2012-015698 filed Jan. 27, 2012, the descriptions of which are incorporated herein by reference.

BACKGROUND OF THE INVENTION

1. Technical Field of the Invention

The present invention relates to a vehicle control apparatus that performs automatic steering control, or in other words, a vehicle automatic steering control apparatus.

2. Related Art

A vehicle automatic steering control apparatus is known that performs automatic steering control. On a road that is divided into a plurality of cruising lanes by white lane-markers (hereinafter referred to as "white lines") such as a paved road, the vehicle automatic steering control apparatus recognizes the white lines from a captured image of the view ahead of or behind the vehicle, and performs automatic steering control such that the vehicle travels near the center of a cruising lane demarcated by two white lines. When the vehicle performs automatic steering, for example, when projecting objects such as a series of poles are placed continuously at uniform intervals on a white line in order to provide a median (i.e., central reservation), the occupant in the vehicle experiences greater stress compared to when the poles are not present, even when the distance between the vehicle and the white line is the same in both instances. This is especially true when the poles are near the eye-level height of the occupant. To prevent this situation, a technology is known in which automatic steering control is performed such that the vehicle is farther away from the white line when the projecting objects are present on the white line, compared to when the projecting objects are not present (refer, for example, to JP-A-2007-22134). Here, the projecting objects refer to objects placed along the white line and include objects placed near the white line.

However, in the technology described in JP-A-2007-22134, focus is placed only on the projecting objects. Control is merely performed such that the vehicle is simply farther away from the projecting objects that in an ordinary state. Therefore, when the vehicle avoids the projecting objects, the vehicle becomes closer to the adjacent lane on the other side by the same extent. When a traveling vehicle is present in the adjacent lane, the vehicle approaches the other vehicle. A problem occurs in that the occupant of the vehicle and the occupant of the vehicle traveling in the adjacent lane both experience discomfort and stress. Therefore, a vehicle automatic steering control apparatus is desired that reduces discomfort and stress to occupants in such instances.

SUMMARY

As an exemplary embodiment, the present application provides a vehicle automatic steering control apparatus including: a lane detecting means for detecting a cruising lane in which an own vehicle is traveling; an off-lane obstacle detecting means for detecting an obstacle positioned outside of the cruising lane, including a vehicle traveling in an adjacent lane; a relative position calculating means for determining a relative position of the off-lane obstacle in relation to the own vehicle; an in-lane ratio calculating means for calculating a ratio (in-lane ratio) of distances from both left and right edges of the cruising lane at which the own vehicle should travel based on the relative position of the off-lane obstacle; a traveling trajectory calculating means for calculating an expected traveling trajectory on which the own vehicle should travel based on the in-lane ratio; and an automatic steering means for performing steering control such that the vehicle travels in adherence to the expected traveling trajectory determined by the travelling trajectory calculating means (first aspect of the present invention).

In the vehicle automatic steering control apparatus configured as described above, the lane detecting means detects the cruising lane in which the own vehicle is traveling. The off-lane obstacle detecting means detects an obstacle positioned outside of the cruising lane, including vehicles traveling in an adjacent lane. The relative position calculating means determines the relative position indicating a relative positional relationship of the off-lane obstacle in relation to the vehicle. The in-lane ratio calculating means calculates the ratio of the distances from both left and right edges of the cruising lane at which the own vehicle should travel that is suitable for suppressing stress placed on an occupant of the own vehicle by the off-lane obstacle, based on the relative position of the off-lane obstacle.

In addition, the traveling trajectory calculating means calculates the expected traveling trajectory within the cruising lane based on the in-lane ratio. The automatic steering means performs steering control of the vehicle in adherence to the expected traveling trajectory determined by the traveling trajectory calculating means.

Therefore, in the vehicle automatic steering control apparatus of the typical example, the in-lane ratio is set based on various off-lane conditions indicating the presence of obstacles including vehicles traveling in an adjacent lane, the state of the obstacles, and the like, in addition to projecting objects separating the lanes. Then, the expected traveling trajectory that is used for steering control of the own vehicle can be set such that discomfort and stress experienced by the occupant are reduced.

Here, the vehicle automatic steering control apparatus includes a parameter generating means for generating at least one of a stress level parameter indicating the amount of stress experienced by the occupant, a stress sensitivity parameter indicating susceptibility of the occupant to stress, and a stress causing parameter indicating the probability of stress being induced in the occupant. The in-lane ratio calculating means calculates the in-lane ratio such that the own vehicle is moved farther away from the off-lane obstacle or prevented from approaching the off-lane obstacle, the greater the parameter generated by the parameter generating means (second aspect of the present invention).

As a result, the vehicle is moved in a direction away from the off-lane obstacle that causes discomfort and stress, or at least prevented from approaching the off-lane obstacle, the greater the parameter generated by the parameter generating means. Therefore, discomfort and stress experienced by the occupant can be further reduced.

In addition, the vehicle automatic steering control apparatus includes a parameter generating means for generating at least one of a stress level parameter indicating the amount of stress experienced by the occupant, a stress sensitivity parameter indicating susceptibility of the occupant to stress, and a stress causing parameter indicating the possibility of stress being induced in the occupant. The in-lane ratio calculating means operates when the parameter generated by the parameter generating means is a threshold value set in advance or greater (third aspect of the present invention).

In this instance, frequent changes in the in-lane ratio, or in other words, a lateral position of the vehicle within the cruising lane can be prevented. Stable traveling can be actualized.

The vehicle automatic steering control apparatus includes a biological signal detecting means for detecting a biological signal of the occupant. The parameter generating means generates the stress level parameter based on the biological signal detected by the biological signal detecting means (fourth aspect of the present invention).

As a result of a stress level parameter such as this being used, whether or not the occupant is actually experiencing stress from the detected off-lane obstacle can be judged. As a result, an instance in which the in-lane ratio is changed and unnecessary steering control is performed regardless of the occupant not experiencing stress can be prevented.

Representative examples of the biological signal are pulse, heart rate, brain waves, blinking, perspiration, and the like. In particular, pulse is characteristic in that the interval (Pulse Repetition Interval: PRI) suddenly becomes faster in times of tension. Therefore, the level of stress experienced by the occupant can be detected through observation of the PRI.

The vehicle automatic steering control apparatus includes an eye-level height estimating means for estimating an eye-level height of the occupant from vehicle information related to the height of the own vehicle. The parameter generating means uses the eye-level height estimated by the eye-level height estimating means as the stress sensitivity parameter (fifth aspect of the present invention).

Even when the size of the obstacle is the same, the oppressiveness felt from an obstacle increases, the lower the eye-level height of the occupant is. The occupant becomes more susceptible to stress. Therefore, the in-lane ratio can be accurately determined through use of a stress sensitivity parameter such as this.

The vehicle automatic steering control apparatus includes a vehicle state detecting means for detecting at least the speed or the acceleration of the own vehicle. The parameter generating means generates the stress sensitivity parameter based on the detection result from the vehicle state detecting means (sixth aspect of the present invention).

Even when the relative positional relationship to the off-lane obstacle is the same, the occupant becomes more susceptible to stress, the faster the speed or the greater the acceleration of the vehicle. Therefore, the in-lane ratio can be accurately determined through use of a stress sensitivity parameter such as this.

In addition, in the vehicle automatic steering control apparatus, the parameter generating means generates the stress causing parameter for each obstacle detected by the off-lane obstacle detecting means. The in-lane ratio calculating means calculates, the in-lane ratio such that the own vehicle moves away from or is prevented from approaching the off-lane obstacle having the greater stress causing parameter (seventh aspect of the present invention).

In other words, various off-lane obstacles are present. The effects of these off-lane obstacles on the occupant are not the same. For example, in an instance in which a vehicle (other vehicle) is traveling alongside the own vehicle in an adjacent lane, the amount of stress placed on the occupant by the other vehicle varies depending on the relative speeds between both vehicles, the size and type of the other vehicle (large-size vehicle, occupant car, or a motorcycle), the behavior (e.g. swerving) of the other vehicle, and the like, in addition to the relative positional relationship between the own vehicle and the other vehicle. Therefore, the in-lane ratio can be accurately determined by taking into consideration such stress causing parameters.

The vehicle automatic steering control apparatus further includes: a history information storage means for storing history information associating the in-lane ratio calculated by the in-lane ratio calculating means and the relative position used to calculate the in-lane ratio; and a history readout means for reading out, from the history information storage means, the in-lane ratio associated with the relative position based on the relative position calculated by the relative position calculating means. The traveling trajectory calculating means performs calculation using the in-lane ratio read out from the history information storage means when the in-lane ratio associated with the relative position calculated by the relative position calculating means is stored in the history information storage means (eighth aspect of the present invention).

As a result of this configuration, load placed on processing devices required for calculation of the in-lane ratio can be reduced through use of history information.

The vehicle automatic steering control apparatus may also include a state presenting means for presenting the calculation result by the in-lane ratio calculating means to the occupant (ninth aspect of the present invention). Furthermore, the vehicle automatic steering control apparatus may include an instruction input means for receiving instruction input regarding whether or not the driver will use the in-lane ratio calculated by the in-lane ratio calculating means. The traveling trajectory calculating means changes the in-lane ratio used to calculate the expected traveling trajectory based on the content of the instruction from the instruction input means (tenth aspect of the present invention).

According to the ninth aspect, the driver can be notified that the lateral position of the vehicle will change or has changed as a result of change in the in-lane ratio. According to the tenth aspect, the vehicle automatic steering control apparatus let the driver judge whether or not the driver desires changing a lateral position of the vehicle, thereby the driver can suppress the unnecessary steering control.

BRIEF DESCRIPTION OF THE DRAWINGS

In the accompanying drawings:

FIG. 20 is a flowchart of the details of lane keeping control according to the eighth embodiment.

DETAILED DESCRIPTION OF THE PREFERRED EMBODIMENTS

Embodiments of the present invention and drawings will hereinafter be described.

First Embodiment

Overall Configuration

Figure 1:
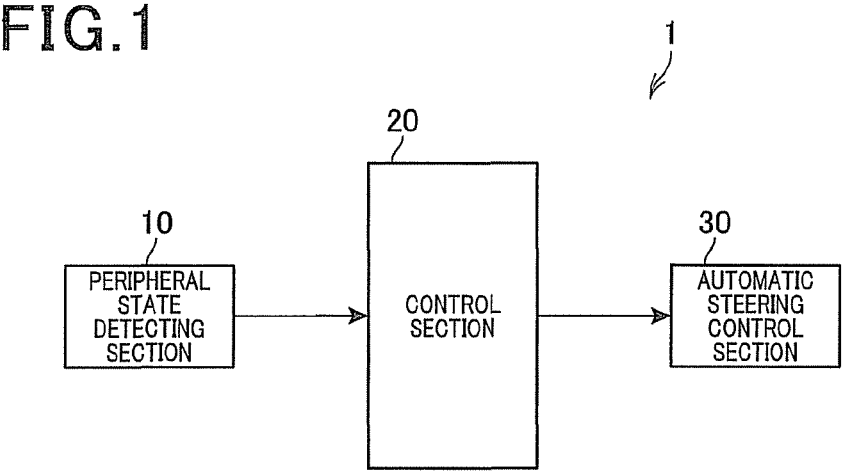
FIG. 1 is a block diagram of a configuration of a vehicle automatic steering control apparatus according to a first embodiment.

As shown in FIG. 1, a vehicle automatic steering control apparatus 1 according to a first embodiment includes a peripheral state detecting section 10, a control section 20, and an automatic steering control section 30. The peripheral state detecting section 10 detects the state of the area surrounding a vehicle 100. The control section 20 sets an expected traveling trajectory of the vehicle 100 based on the detection result from the peripheral state detecting section 10. The control section 20 then generates a steering command to make the vehicle 100 travel in adherence to the expected traveling trajectory. The automatic steering control section 30 performs automatic control of steering in adherence to the steering command from the control section 20.

Figure 2:
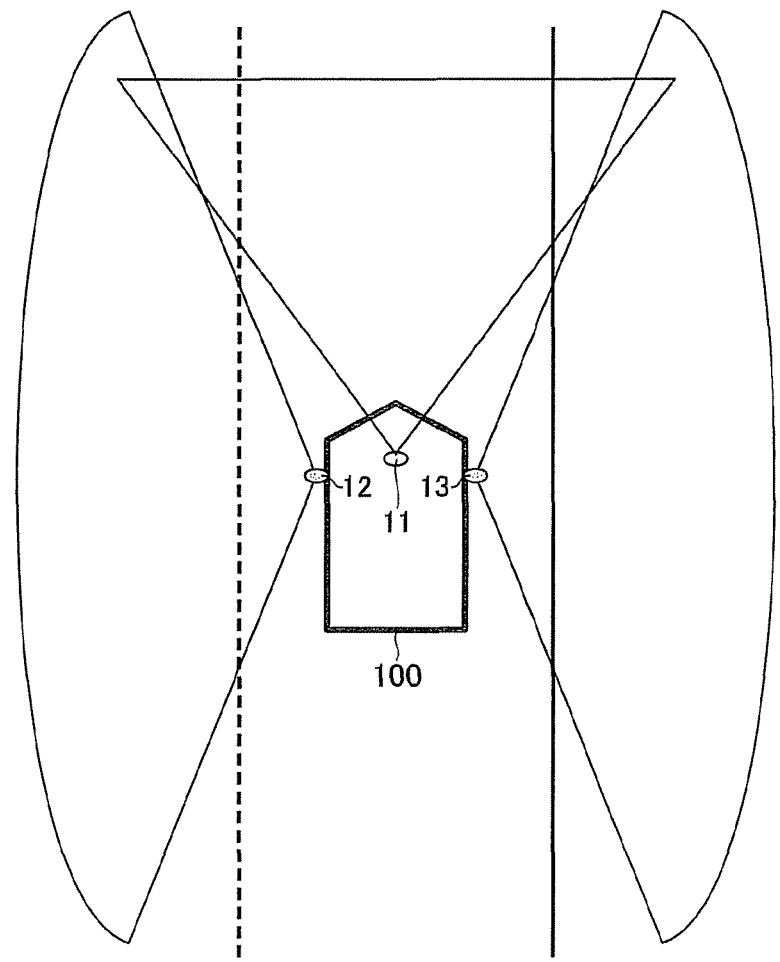
FIG. 2 is an explanatory diagram of the arrangement of a peripheral state detecting section and detection areas.

As shown in FIG. 2, the peripheral state detecting section 10 includes at least a front sensor 11, a left-side sensor 12, and a right-side sensor 13. The detection area of the front sensor 11 is a predetermined angular range of which the center is the direction straight ahead of the vehicle 100. The detection area of the left-side sensor 12 is a predetermined angular range of which the center is the vehicle width direction on the left side of the vehicle 100. The detection area of the right-side sensor 13 is a predetermined angular range on the right side of the vehicle 100 (similar to that of the left-side sensor 12). The front sensor 11 is composed of an image sensor (camera) or a laser radar. The left- and right-side sensors 12 and 13 are composed of any of an image sensor, a radar sensor, a millimeter wave sensor, and a sonar.

The automatic steering control section 30 is a known control section that controls the steering force of steering in adherence to the steering command from the control section 20. Here, a detailed description thereof is omitted. The control section 20 is composed of a known microcomputer mainly configured by a central processing unit (CPU), a read-only memory (ROM), and a random access memory (RAM). The control section 20 performs steering control to keep the vehicle 100 in the lane in which it is traveling (This control is hereinafter referred to as "lane keeping control"). As a result, the control section 20 at least can reduce the driver's burden.

<Lane Keeping Control>

When the driver operates a start switch (not shown), the control section 20 repeatedly starts lane keeping control at a predetermined interval set in advance, until a certain cancel condition (such as engine stop or a switch releasing operation) is met.

Hereafter, the operational flow of lane keeping control is described with reference to FIG. 3. When the process is started, first, at Step (hereinafter abbreviated to "S") S110, the control section 20 detects the lane in which the own vehicle 100 is traveling (referred to, hereinafter, as a "subject lane") based on the detection result from the front sensor 11. Specifically, the control section 20 detects white lines or yellow lines drawn on a road surface based on the detection result from the front sensor 11. The white lines or yellow lines are division lines (such as a median, a lane division line, or a road side line). The control section 20 then identifies the lane in which the vehicle 100 is traveling based on the division lines. The control section 20 directly sets the identified lane as the subject lane. However, in an instance in which an obstacle (such as a parked vehicle or a vehicle involved in an accident) is protruding into the lane in which the vehicle 100 is traveling, regarding the protruding portion, the boundary between lane and the protruding obstacle is considered the boundary of the subject lane. In an instance in which a division line is not drawn on the road surface, a travelable area determined by the position of a structure such as a guardrail, a side ditch, or a fence, a position of a cliff on a mountain path, or the like is considered the subject lane.

At S120, the control section 20 detects the conditions outside of the subject lane (off-lane conditions) based on the detection results from the left-side sensor 12 and the right-side sensor 13. Specifically, the control section 20 detects off-lane obstacles that are obstacles (projecting objects such as poles indicating a lane divider, other traveling vehicles, parked vehicles, as well as geographical features, structures, and the like restricting the area of the subject lane) present outside of the subject lane. The control section 20 determines target information including position, size (height and length along the cruising lane), and the like for each off-lane obstacle. Here, the obstacles protruding into the lane in which the vehicle 100 is running shall be also considered as off-lane obstacles, e.g. a branch of a tree, the car might hit the tree branch and be damaged.

At S130, the control section 20 performs an in-lane ratio calculating process with the position of the vehicle 100 in the width direction of the subject lane as a lateral position, and the lateral position expressed by a ratio of the distances from both edges (left and right edges) in the width direction of the subject lane as an in-lane ratio. In the in-lane ratio process, the control section 20 determines the in-lane ratio (current in-lane ratio) indicating a current lateral position that is the current lateral position of the vehicle 100, and the in-lane ratio (target in-lane ratio) indicating a target lateral position. The target lateral position is a lateral position suitable for suppressing stress placed on an occupant of the vehicle 100 by the off-lane conditions detected at S120.

Here, the in-lane ratio is expressed by [left-side distance]:[right-side distance], with the distance in the width direction from the center of the subject lane to the left or right edge of the lane (in other words, half of the lane width of the subject lane) as 1. In other words, when the in-lane ratio is 1:1, the lateral position is the center in the width direction of the subject lane. The lateral position indicated by an in-lane ratio of 0.9:1.1 is a position closer to the left side from the center in the width direction of the subject lane.

At subsequent S140, the control section 20 determines the expected traveling trajectory based on the current in-lane ratio and the target in-lane ratio both of which are the calculation results at S130. The expected traveling trajectory is required to smoothly change the lateral position of the vehicle 100 from the current lateral position identified by the current in-lane ratio to the target lateral position identified by the target in-lane ratio.

Finally, at S150, the control section 20 determines a steering control quantity required to make the vehicle 100 travel in adherence to the expected traveling trajectory determined at S140. The control section 20 outputs the steering control quantity as the steering command to the automatic steering control section 30. The control section 20 then ends the process. The control section 20 repeatedly performs similar operations.

<In-Lane Ratio Calculating Process>

Details of the in-lane ratio calculating process performed at S130 will be described with reference to the flowchart in FIG. 4.

When the in-lane ratio calculating process is started, first, at S210, the control section 20 detects the lane width of the subject lane and the current in-lane ratio from the detection result at S110. Then, at subsequent S220, the control section 20 judges whether or not an off-lane obstacle (a condition that may place stress on the occupant) is present within a prescribed area (such as an area several tens of meters ahead and behind the vehicle 100) set in advance, from the results of the process at S120. When judged that an off-lane obstacle is not present, the control section 20 immediately ends the in-lane ratio calculating process. On the other hand, when judged that an off-lane obstacle is present, the control section 20 proceeds to S230. The control section 20 determines a relative position between each off-lane obstacle present in the prescribed area and the vehicle 100. The relative position is expressed by a lateral distance and a longitudinal distance. The lateral distance is the distance from a virtual line that passes through the center in the vehicle width direction of the vehicle 100 and runs along the subject lane. The longitudinal distance is the distance from a virtual line that passes through a mounting position of the front sensor 11 and runs along the vehicle width direction.

At subsequent S240, the control section 20 determines the target in-lane ratio based on the calculation result at S230. Specifically, when the off-lane obstacles are present both to the left and right of the subject lane, the control section 20 sets the target in-lane ratio such that the lateral position at which the distances in the lateral direction to both obstacles are equally spaced is the target lateral position. In addition, when the off-lane obstacle is present on only either of the left side or the right side of the subject lane, the control section 20 sets the target in-lane ratio such that a position away from the off-lane obstacle by a lateral distance (referred to, hereinafter, as "stress reducing distance") set in advance is the target lateral position.

At S250, the control section 20 judges whether or not the side surface of the vehicle 100 (a point that is half the vehicle width away from the target lateral position in the width direction) identified from the target in-lane ratio deviates from the subject lane. When judged that the side surface does not deviate from the subject lane, the control section 20 ends the in-lane ratio calculating process.

On the other hand, when judged that the vehicle side surface deviates from the subject lane, at S260, the control section 20 adjusts the target in-lane ratio such that the vehicle side surface is within the subject lane. The control section 29 then ends the in-lane ratio calculating process. When judged "NO" at S220 and the target in-lane ratio is not calculated, the control section 20 performs the traveling trajectory calculating process at S120 using the target in-lane ratio determined by the previous in-lane ratio calculating process.

<Operations>

Figure 5:
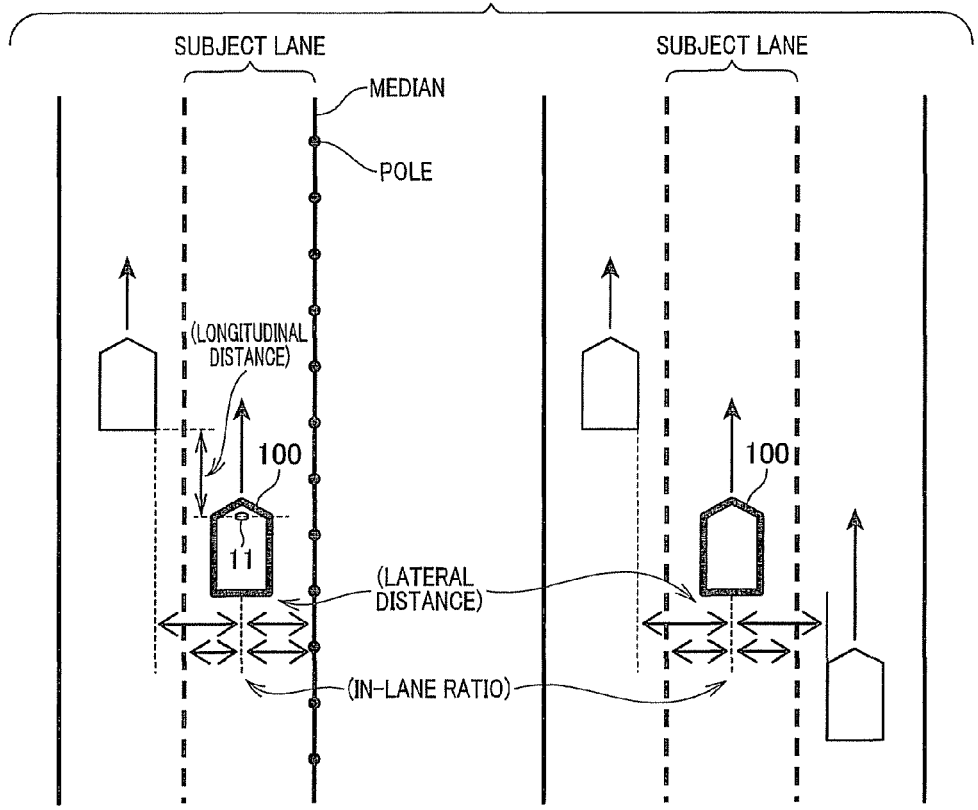
FIG. 5 is an explanatory diagram of examples of a relationship between off-lane conditions and a setting state of the in-lane ratio.

In the vehicle automatic steering control apparatus 1 configured as described above, in an instance in which projecting objects (median) are present on the right side of the subject lane and a passing vehicle is present on the left side of the subject lane, as shown on the left side in FIG. 5, the median is closer to the subject lane than the passing vehicle. Therefore, the target in-lane ratio is calculated such that the vehicle 100 is closer to the left side in relation to the center of the subject lane. This is because, on the left side in FIG. 5, the passing vehicle is traveling farther to the left from the left edge of the subject lane, whereas the median configures the right edge of the subject lane.

In an instance in which a passed vehicle is present on the right side and a passing vehicle is present on the left side of the subject lane, and both vehicles are traveling near the center of their respective cruising lanes, as shown on the right side in FIG. 5, the positional relationship between both vehicles and the subject lane is almost the same. Therefore, the target in-lane ratio is calculated such that the target lateral position of the vehicle 100 is substantially the center of the subject lane.

<Effects>

As described above, in the vehicle automatic steering control apparatus 1 according to the first embodiment, the target in-lane ratio is determined based on the relative position to all off-lane obstacles (off-lane conditions that may place stress on the occupant) within a prescribed area, in addition to projecting objects configuring the median. Therefore, steering control can be accurately performed such that the vehicle 100 is positioned in a lateral position suitable for reducing stress placed on the occupant. As a result, stress placed on the occupant by off-lane conditions can be reduced.

According to the first embodiment, the peripheral information detecting section 10 (particularly the front sensor 11) and the control section 20 performing the process at S110 are equivalent to a lane detecting means. The peripheral information detecting section 10 (particularly the left-side sensor 12 and the right-side sensor 13) and the control section 20 performing the process at S120 are equivalent to an obstacle detecting means. The control section 20 performing the process at S230 is equivalent to a relative position calculating means. The control section 20 performing the process at S240 is equivalent to an in-lane ratio calculating means. The control section 20 performing the process at S140 is equivalent to a traveling trajectory calculating means. The automatic steering control section 30 and the control section 20 performing the process at S150 are equivalent to an automatic steering means.

Second Embodiment

A second embodiment will be described.

<Configuration>

Figure 6:
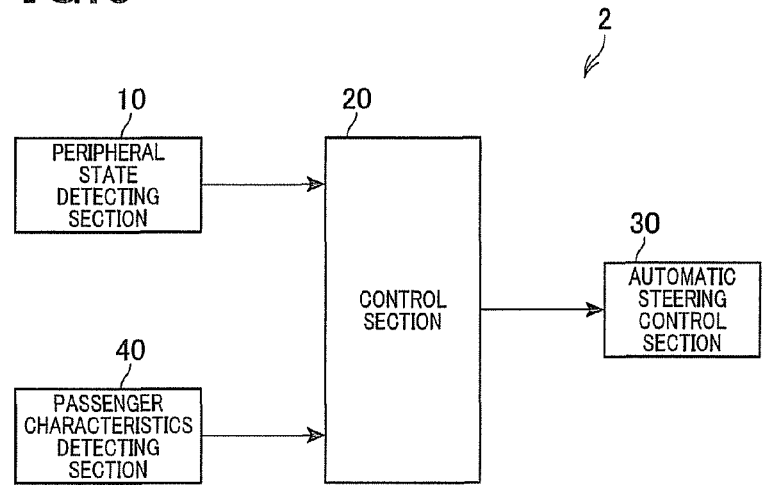
FIG. 6 is a block diagram of a configuration of a vehicle automatic steering control apparatus according to a second embodiment.

A vehicle automatic steering control apparatus 2 according to the second embodiment, as shown in FIG. 6, includes the peripheral state detecting section 10, the control section 20, and the automatic steering control section 30 in a manner similar to the vehicle automatic steering control apparatus 1. The vehicle automatic steering control apparatus 2 also includes an occupant characteristics detecting section 40. The occupant characteristics detecting section 40 is composed of an image sensor that captures the periphery of the face of the occupant. In addition, a part of the in-lane ratio calculating process performed by the control section 20 differs from that according to the first embodiment. The differing part will mainly be described.

<In-Lane Ratio Calculating Process>

Figure 4:
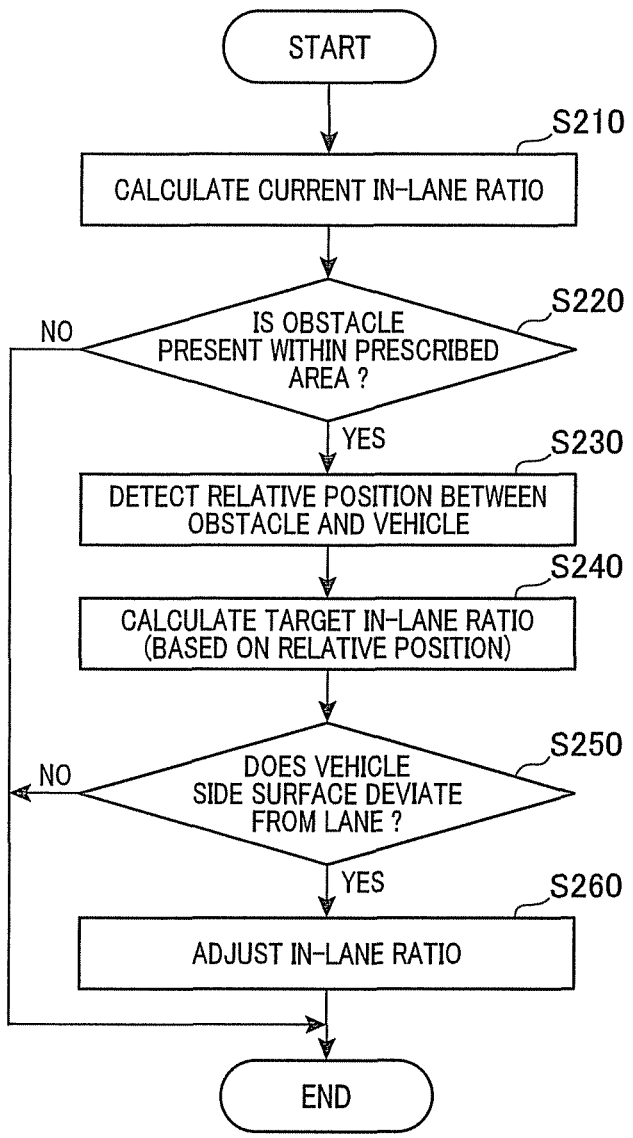
FIG. 4 is a flowchart of the details of an in-lane ratio calculating process according to the first embodiment.
Figure 7:
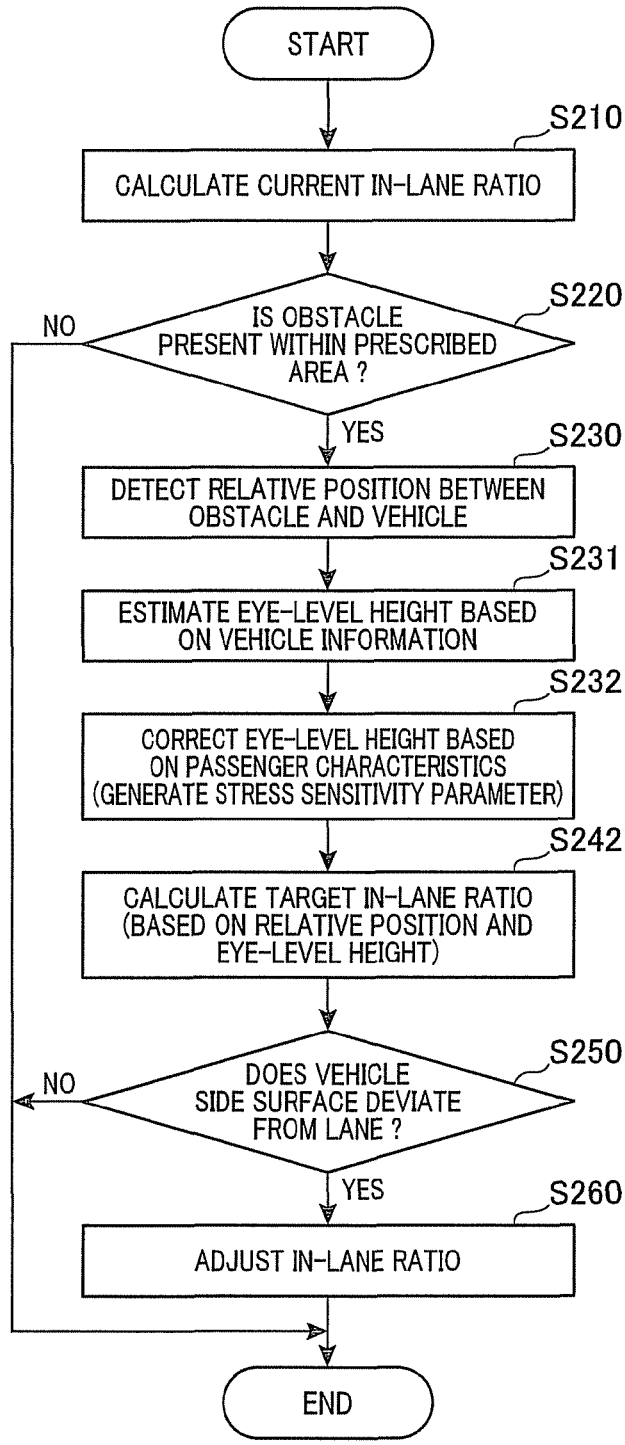
FIG. 7 is a flowchart of the details of an in-lane ratio calculating process according to the second embodiment.

As shown in FIG. 7, in the in-lane ratio calculating process according to the second embodiment, S232 is added, and S240 is replaced by S242, in comparison with the process shown in FIG. 4.

In other words, after the processes at S210 to S230 are performed, at S231, the control section 20 estimates the eye-level height of the occupant based on vehicle information (specifications) related to the height of the vehicle 100. At subsequent S232, the control section 20 detects the eye position (height) of the occupant as occupant characteristics based on an image acquired by the occupant characteristics detecting section 40. The control section 20 then determines the amount of deviation of the detection result from a standard eye position. The control section 20 then corrects the eye-level height estimated at S231 in adherence to on the amount of deviation. According to the second embodiment, the eye-level height is equivalent to a stress sensitivity parameter.

Next, at S242, the control section 20 determines the target in-lane ratio based on the calculation results at S230 and S232. The control section 20 then performs the processes at S250 to S260 and ends the in-lane ratio calculating process. The process at S242 is basically similar to that performed at S240. However, when an off-lane obstacle is present on only either of the left side or the right side of the subject lane, the control section 20 sets the stress reducing distance to be greater, the lower the eye-level height is.

<Operations>

In other words, even when the off-lane conditions are the same, the level of stress experienced by the occupant (stress sensitivity parameter) differs depending on how high the position of the occupant's eyes is. In general, the higher the position of the occupant's eyes, the lower the stress becomes. Therefore, as shown on the left side in FIG. 8, the in-lane ratio is set such that the stress reducing distance becomes shorter. On the other hand, in general, when the position of the occupant's eyes is low, the level of stress experienced by the occupant becomes high. Therefore, as shown on the right side in FIG. 8, the in-lane ratio is set such that the stress reducing distance becomes longer.

<Effects>

In the vehicle automatic steering control apparatus 2 configured as described above, an accurate target in-lane ratio is set based on characteristics of the occupant that affect how stress is felt.

According to the second embodiment, the occupant characteristics detecting section 40 and the control section 20 performing the process at S231 and S232 are equivalent to an eye-level height estimating means and a parameter generating means.

In addition, according to the second embodiment, the eye-level height estimated based on vehicle information and corrected based on occupant characteristics are used as the stress sensitivity parameter. However, the process at S232 may be omitted. The eye-level height estimated based on the vehicle information may be used as is as the stress sensitivity parameter.

Third Embodiment

A third embodiment will be described.

<Configuration>

Figure 9:
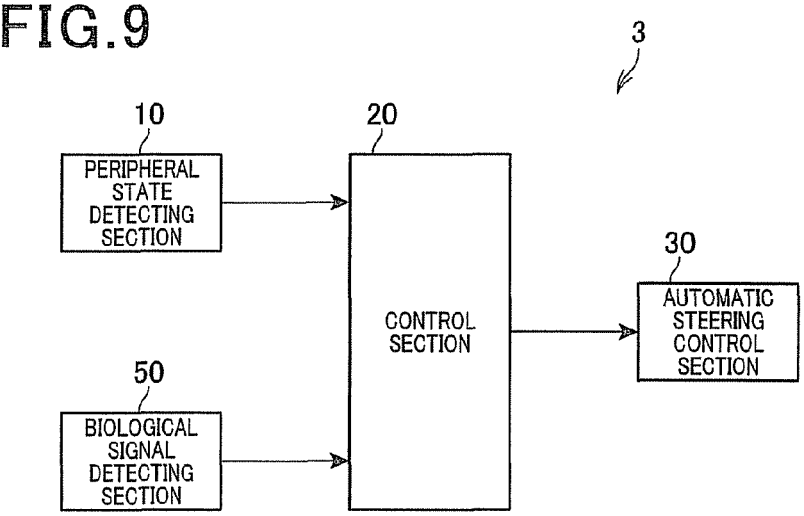
FIG. 9 is a block diagram of a configuration of a vehicle automatic steering control apparatus according to a third embodiment.

A vehicle automatic steering control apparatus 3 according to the third embodiment, as shown in FIG. 9, includes the peripheral state detecting section 10, the control section 20, and the automatic steering control section 30 in a manner similar to the vehicle automatic steering control apparatus 1. The vehicle automatic steering control apparatus 3 also includes a biological signal detecting section 50. The biological signal detecting section 50 detects a biological signal from the occupant.

The biological signal detecting section 50 is composed of a pulse sensor that detects pulse as the biological signal.

In addition, a part of the in-lane ratio calculating process performed by the control section 20 differs from that according to the first embodiment. The differing part will mainly be described.

<In-Lane Ratio Calculating Process>

Figure 10:
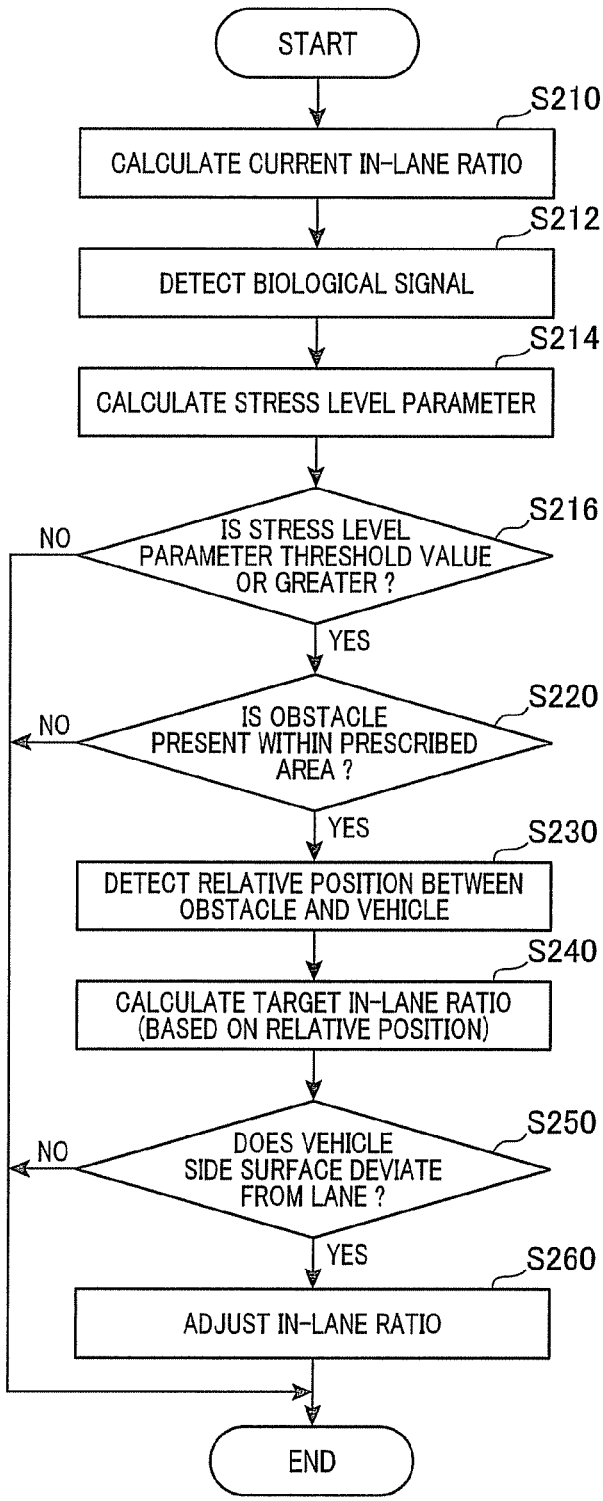
FIG. 10 is a flowchart of the details of lane keeping control according to a third embodiment.

As shown in FIG. 10, in the in-lane ratio calculating process according to the third embodiment, S212, S214, and S216 are added, in comparison with the process shown in FIG. 4.

In other words, the control section 20 calculates the current in-lane ratio at S210. Then, at S212, the control section 20 detects the biological signal by the biological signal detecting section 50. At subsequent S214, the control section 20 calculates a stress level parameter indicating the amount of stress experienced by the occupant based on the detected biological signal. The stress level parameter is set such as to be a greater value, the shorter the PRI is. This is based on the PRI becoming short in times of tension.

Then, at S216, the control section 20 judges whether or not the stress level parameter is a threshold value set in advance or greater. When judged that the stress level parameter is the threshold value or greater, the control section 2 immediately ends the in-lane ratio calculating process. On the other hand, when judged that the stress level parameter is less than the threshold value, the control section 20 performs the processes at S220 to S260. The control section 20 then ends the in-lane ratio calculating process.

<Operations>

Figure 11:
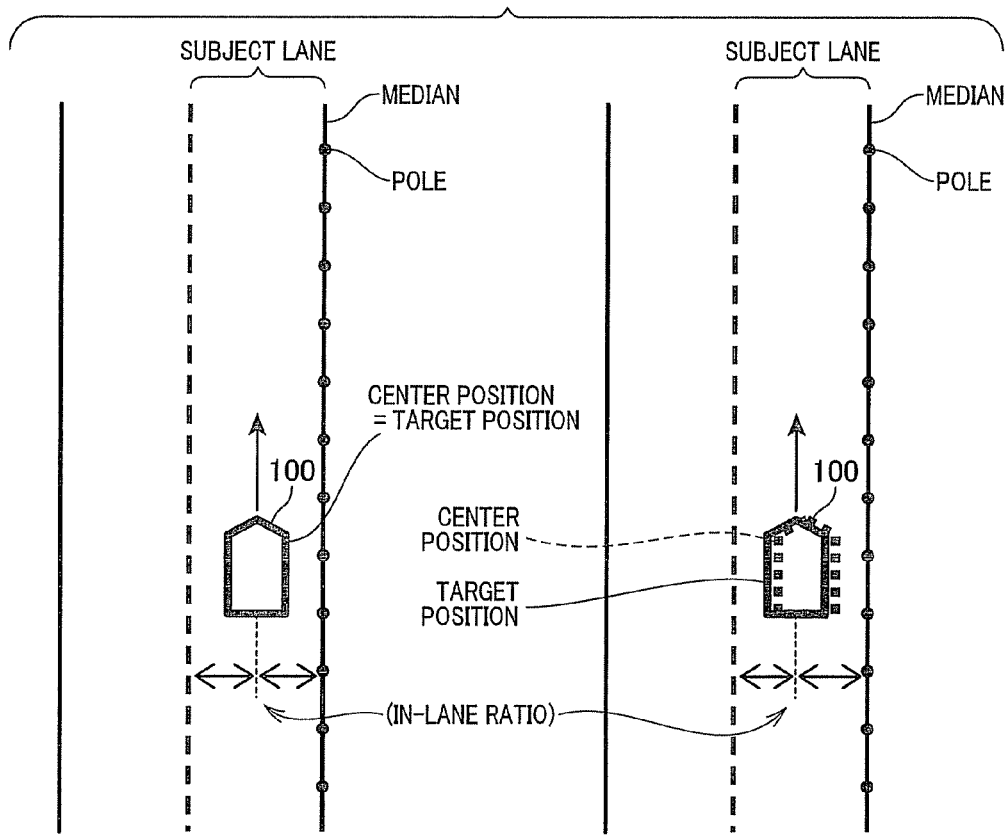
FIG. 11 is an explanatory diagram of examples of a relationship between off-lane conditions and a setting state of the in-lane ratio.

In the vehicle automatic steering control apparatus 3 configured as described above, even when projecting objects (median) are present on the right side of the subject lane, as shown on the left side in FIG. 11, the in-lane ratio is held as is when the stress level parameter is less than a threshold value. As shown on the right side in FIG. 11, the in-lane ratio is set such that the vehicle 100 moves away from the median when the stress level parameter is the threshold value or greater.

<Effects>

As described above, in the vehicle automatic steering control apparatus 3, the in-lane ratio is changed based on the off-lane conditions only when the stress level parameter is a threshold value or greater. Therefore, an instance in which unnecessary steering control is performed regardless of the occupant not experiencing significant stress can be prevented. According to the third embodiment, the biological signal detecting section 50 and the control section 20 performing the process at S212 are equivalent to a biological signal detecting means. The control section 20 performing the process at S214 is equivalent to the parameter generating means.

Fourth Embodiment

A fourth embodiment will be described.

The basic configuration of a vehicle automatic steering control apparatus according to the fourth embodiment is substantially similar to that of the vehicle automatic steering control apparatus 3 according to the third embodiment. A part of the in-lane ratio calculating process performed by the control section 20 differs from that according to the first embodiment. The differing part will mainly be described.

<In-Lane Ratio Calculating Process>

Figure 12:
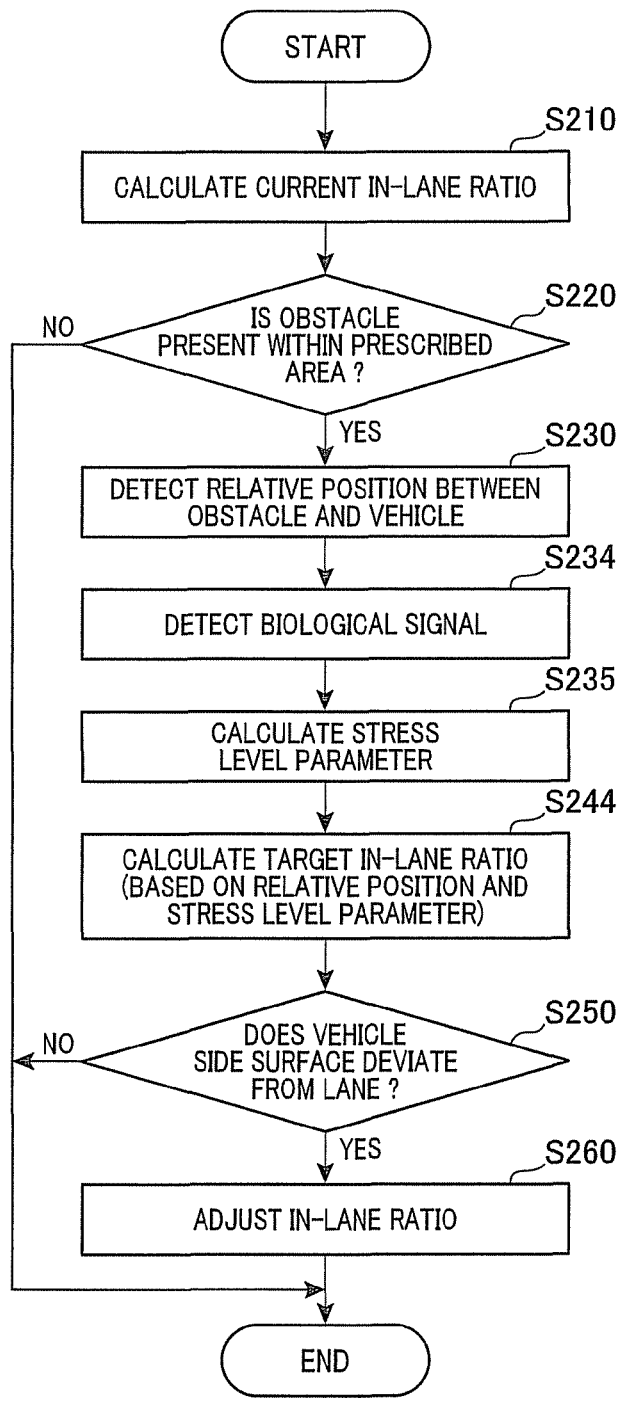
FIG. 12 is a flowchart of the details of an in-lane ratio calculating process according to a fourth embodiment.

As shown in FIG. 12, in the in-lane ratio calculating process according to the fourth embodiment, S234 and S235 are added, and S240 is replaced by S244, in comparison with the process shown in FIG. 4.

In other words, after the processes at S210 to S230 are performed, at S234, the control section 20 detects the biological signal by the biological signal detecting section 50. At subsequent S235, the control section 20 calculates the stress level parameter indicating the amount of stress experienced by the occupant based on the detected biological signal. The processes at S234 and S235 are similar to the processes at S212 and S214 in FIG. 10.

At subsequent S244, the control section 20 determines the target in-lane ratio based on the calculation results at S230 and S235. The control section 20 then performs the processes at S250 to S260 and ends the in-lane ratio calculating process. The process at S244 is basically similar to that performed at S240. However, when an off-lane obstacle is present on only either of the left side or the right side of the subject lane, the control section 20 sets the stress reducing distance to be greater, the greater the stress level parameter is.

<Operations>

Figure 8:
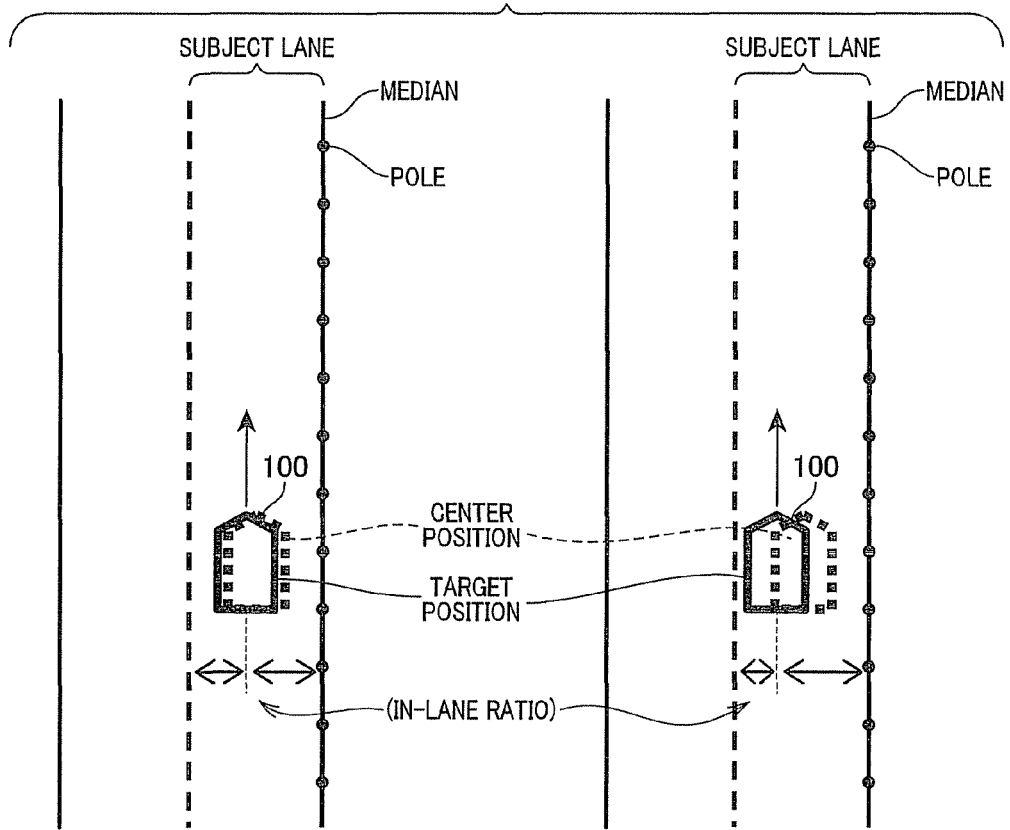
FIG. 8 is an explanatory diagram of examples of a relationship between off-lane conditions and a setting state of the in-lane ratio.

According to the fourth embodiment configured as described above, even when the off-lane conditions are the same, as shown on the left side in FIG. 8, the in-lane ratio is set such that the stress reducing distance is shorter, the lower the level of stress actually experienced by the occupant is. On the other hand, when the position of the occupant's eyes is lower, the level of stress experienced by the occupant becomes higher. Therefore, as shown on the right side in FIG. 8, the in-lane ratio is set such that the stress reducing distance becomes longer.

<Effects>

As described above, according to the fourth embodiment, an accurate target in-lane ratio can be set based on the level of stress actually experienced by the occupant. According to the fourth embodiment, the biological signal detecting section 50 and the control section 20 performing the process at S234 are equivalent to the biological signal detecting means. The control section 20 performing the process at S235 is equivalent to the parameter generating means.

Fifth Embodiment

A fifth embodiment will be described.

The basic configuration of a vehicle automatic steering control apparatus according to the fifth embodiment is substantially similar to that of the vehicle automatic steering control apparatus 3 according to the third and fourth embodiments. A part of the in-lane ratio calculating process performed by the control section 20 differs from those according to the third and fourth embodiments. The differing part will mainly be described.

According to the fifth embodiment, the control section 20 (microcomputer) includes a non-volatile memory. A history storage area is secured in the non-volatile memory. The history storage area stores therein history information associating a relation position of an off-lane obstacle and a stress level parameter calculated based on the relative position.

<In-Lane Ratio Calculating Process>

Figure 13:
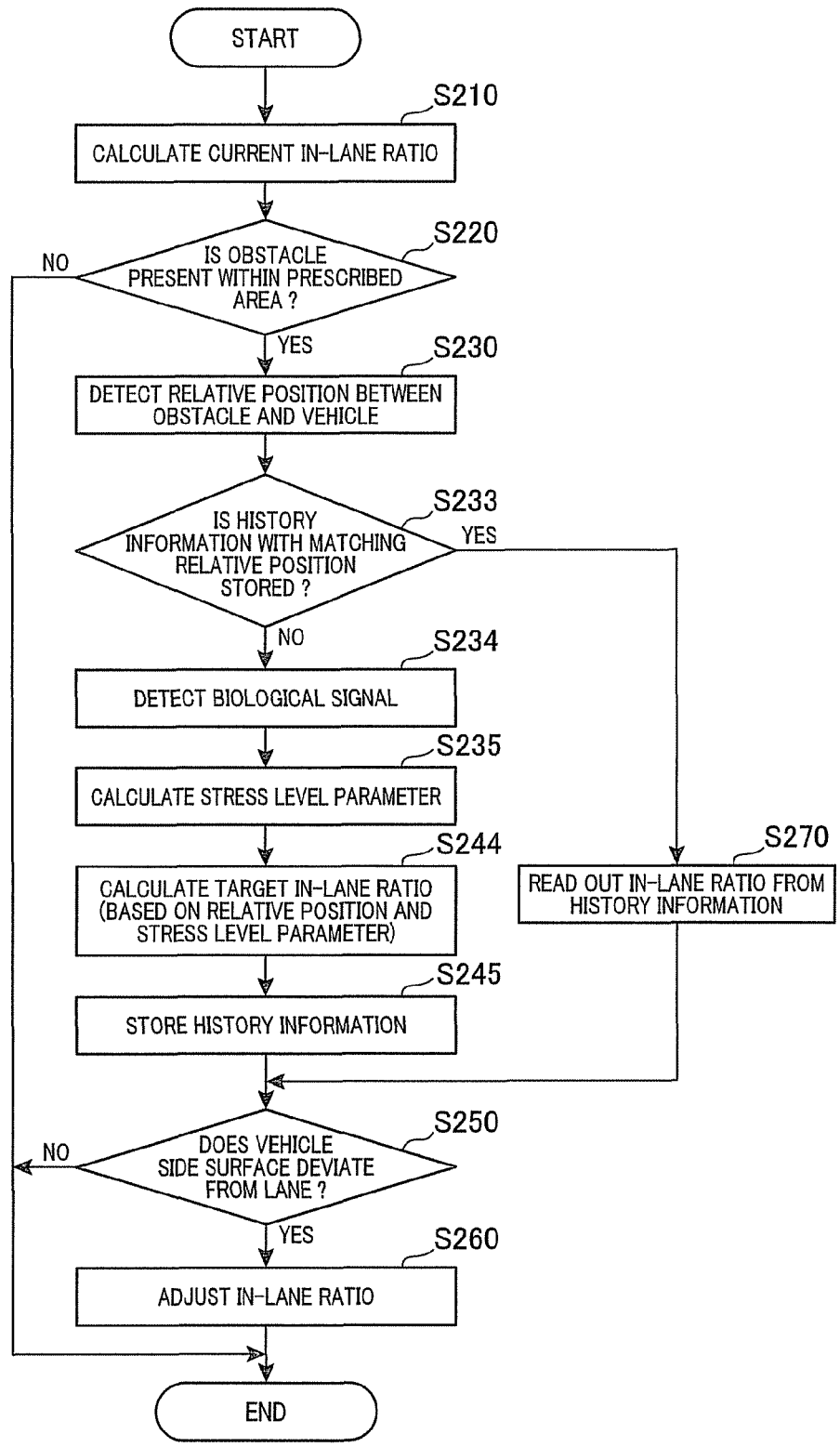
FIG. 13 is a flowchart of the details of an in-lane ratio calculating process according to a fifth embodiment.

As shown in FIG. 13, in the in-lane ratio calculating process according to the fifth embodiment, S233, S345, and S270 are added, in comparison with the process shown in FIG. 12.

In other words, after the processes at S210 to S230 are performed, at S233, the control section 20 judges whether or not the history information matching the relative position calculated at S230 is stored in the history storage area. When judged that the matching history information is stored, the control section 20 proceeds to S270. The control section 20 then reads out the in-lane ratio indicated in the history information from the history storage area and sets the read-out value as the target in-lane ratio.

On the other hand, when judged that the matching history information is not stored, the control section 20 performs the processes at S234 to S244. The control section 20 calculates the target in-lane ratio based on the relative position and the stress level parameter. Then, at S245, the control section 20 stores the calculated target in-lane ratio with the relative position used in the calculation in the history storage area as history information.

After the control section 20 determines the target in-lane ratio by the processes at S234 to S245 or the process at S270, the control section 20 ends the in-lane ratio calculating process.

<Effects>

As described above, according to the fifth embodiment, when the surrounding conditions (the relative position between the off-lane obstacles and the vehicle 100) are the same, stress experienced by the occupant can be considered equal. Therefore, when the in-lane ratio determined under the same conditions is stored as history information, the value stored in the history storage area is used without the stress level parameter and the like being calculated again.

Therefore, according to the fifth embodiment, processing load required to calculate the target in-lane ratio can be reduced. According to the fifth embodiment, the history storage area and the control section 20 performing the process at S245 are equivalent to a history information storage means. The control section 20 performing the process at S270 is equivalent to a history readout means.

According to the fifth embodiment, the in-lane ratio calculated at S244 is stored as the history information. However, the in-lane ratio after adjustment (after the processes at S250 and S260) may be stored. In this instance, the in-lane ratio calculating process is completed immediately after the in-lane ratio in the history information is read out at S270.

Sixth Embodiment

A sixth embodiment will be described.

<Configuration>

Figure 14:
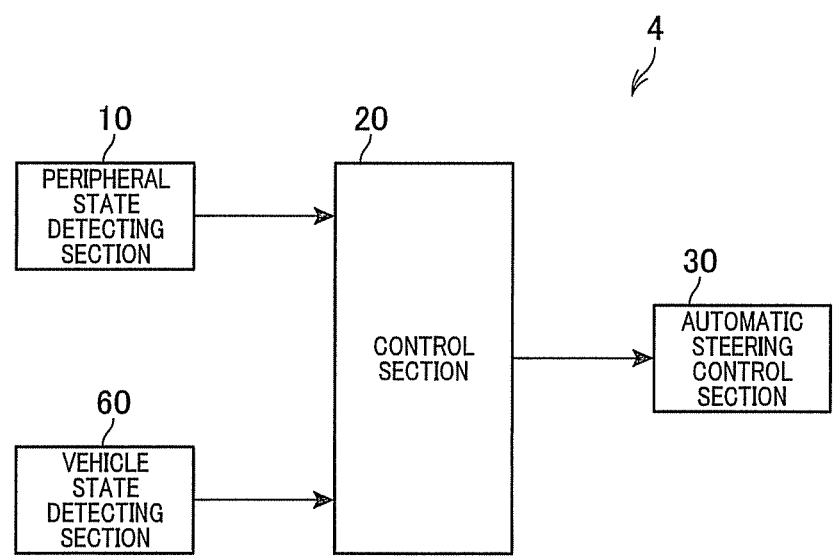
FIG. 14 is a block diagram of a configuration of a vehicle automatic steering control apparatus according to a sixth embodiment.

A vehicle automatic steering control apparatus 4 according to the sixth embodiment, as shown in FIG. 14, includes the peripheral state detecting section 10, the control section 20, and the automatic steering control section 30 in a manner similar to the vehicle automatic steering control apparatus 1 according to the first embodiment. The vehicle automatic steering control apparatus 4 according to the sixth embodiment also includes a vehicle state detecting section 60 that detects the state of the vehicle 100.

The vehicle state detecting section 60 is configured by at least a speed sensor, an acceleration sensor, and a yaw-rate sensor. In addition, a part of the in-lane ratio calculating process performed by the control section 20 differs from that according to the first embodiment. The differing part will mainly be described.

<In-Lane Ratio Calculating Process>

Figure 15:
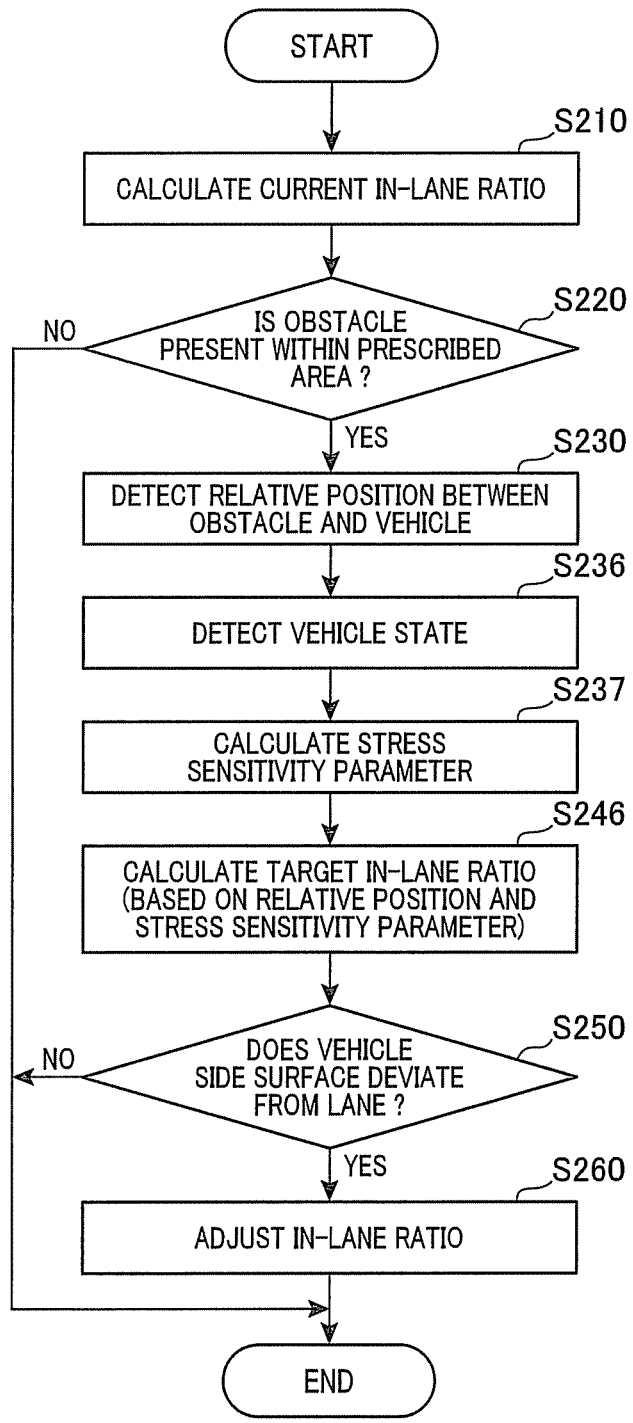
FIG. 15 is a flowchart of the details of an in-lane ratio calculating process according to the sixth embodiment.

As shown in FIG. 15, in the in-lane ratio calculating process according to the sixth embodiment, S236 and S237 are added, and S240 is replaced by S246, in comparison with the process shown in FIG. 4.

In other words, after the processes at S210 to S230 are performed, at S236, the control section 20 detects a vehicle state quantity (such as speed, acceleration, and yaw rate) indicating the vehicle state by the vehicle state detecting section 60. At subsequent S237, the control section 20 calculates a stress sensitivity parameter based on the detected vehicle state quantity. The stress sensitivity parameter indicates the susceptibility of the occupant to stress. The stress sensitivity parameter is set to be a greater value, the greater the speed, acceleration, and yaw rate are.

Then, at subsequent S246, the control section 20 determines the target in-lane ratio based on the calculation results at S230 and S237. The control section 20 then performs the processes at S250 to S260 and ends the in-lane ratio calculating process. The process at S246 is basically similar to that performed at S240. However, when an off-lane obstacle is present on only either of the left side or the right side of the subject lane, the control section 20 sets the stress reducing distance to be greater, the greater the stress sensitivity parameter is.

<Operations>

In the vehicle automatic steering control apparatus 4 configured as described above, even when the off-lane conditions are the same, as shown on the left side in FIG. 8, the in-lane ratio is set such that the stress reducing distance is shorter when the vehicle state is that which reduces the stress sensitivity parameter of the occupant. On the other hand, as shown on the right side in FIG. 8, the in-lane ratio is set such that the stress reducing distance is longer when the vehicle state is that which increases the stress sensitivity parameter of the occupant.

<Effects>

In the vehicle automatic steering control apparatus 4 configured as described above, an accurate target in-lane ratio can be set based on the state of the vehicle 100. According to the sixth embodiment, the vehicle state detecting section 60 and the control section 20 performing the process at S236 are equivalent to a vehicle state detecting means. The control section 20 performing the process at S237 is equivalent to the parameter generating means.

Seventh Embodiment

A seventh embodiment will be described.

The basic configuration of a vehicle automatic steering control apparatus according to the seventh embodiment is substantially similar to that of the vehicle automatic steering control apparatus 1 according to the first embodiment. A part of the in-lane ratio calculating process performed by the control section 20 differs from that according to the first embodiment. The differing part will mainly be described.

<In-Lane Ratio Calculating Process>

Figure 16:
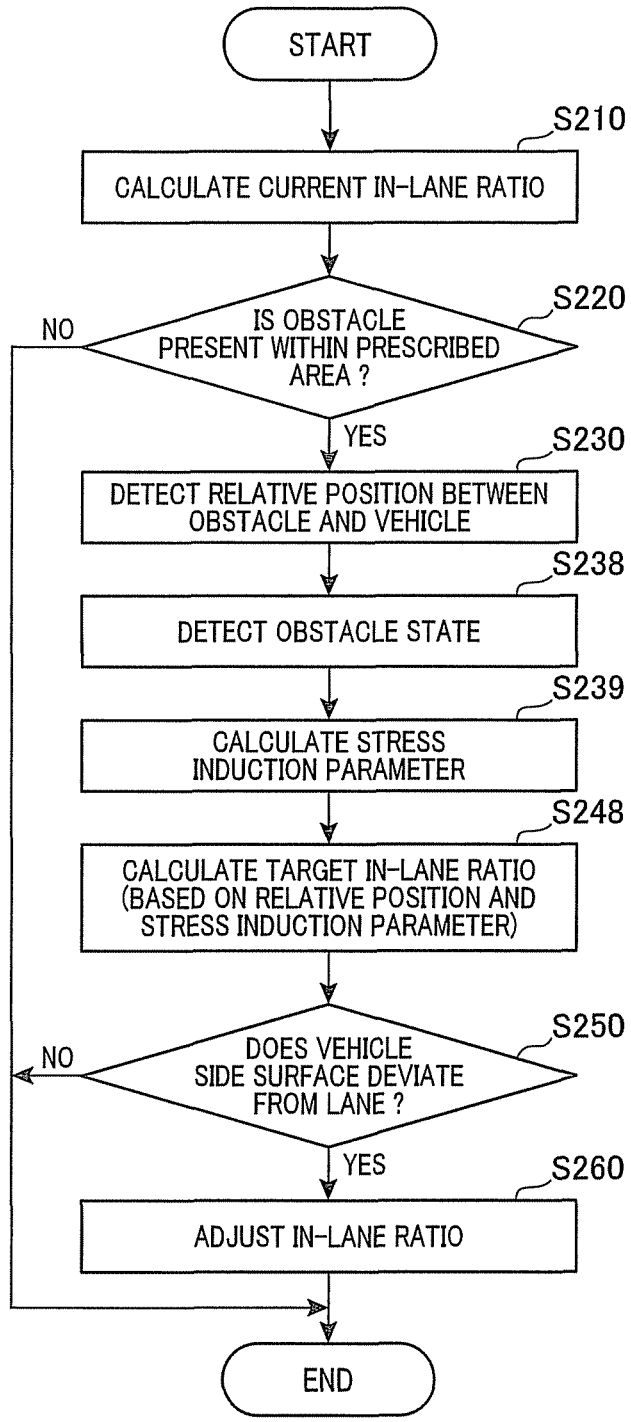
FIG. 16 is a flowchart of the details of an in-lane ratio calculating process according to a seventh embodiment.

As shown in FIG. 16, in the in-lane ratio calculating process according to the seventh embodiment, S238 and S289 are added, and S240 is replaced by S248, in comparison with the process shown in FIG. 4.

In other words, after the processes at S210 to S230 are performed, at S238, the control section 20 detects the state of the off-lane obstacles (such as size, behavior, and relative speed in relation to the vehicle 100). At S239, the control section 20 calculates a stress causing parameter for each off-lane obstacle based on the detected state of the off-lane obstacles. The stress causing parameter indicates a predicted value of the amount of stress induced in the occupant. The stress causing parameter is set such as become greater, the greater the size of the off-lane obstacle is. In particular, the stress causing parameter is set such as to become greater, the greater the amount of swerving in the driving is (the more abnormal the behavior is) or the greater the relative speed in relation to the vehicle 100 is (in the approaching direction).

At subsequent S244, the control section 20 determines the target in-lane ratio based on the calculation results at S230 and S238. The control section 20 then performs the processes at S250 to S260 and ends the in-lane ratio calculating process. In the process at S248, when the off-lane obstacles are present on both the left- and right-sides of the subject lane, the control section 20 compares the stress causing parameters determined for each off-lane obstacle. The control section 20 sets the target in-lane ratio such that the position farther away from the off-lane obstacle having the greater stress causing parameter is the target lateral position.

In addition, when an off-lane obstacle is present on only either of the left side or the right side of the subject lane, the stress reducing distance is set to be greater, the greater the stress causing parameter is. Alternatively, when an in-lane ratio that brings the vehicle 100 closer to the off-lane obstacle having the greater stress causing parameter is calculated, the calculation result is ignored and the current in-lane ratio is maintained.

<Operations>

Figure 17:
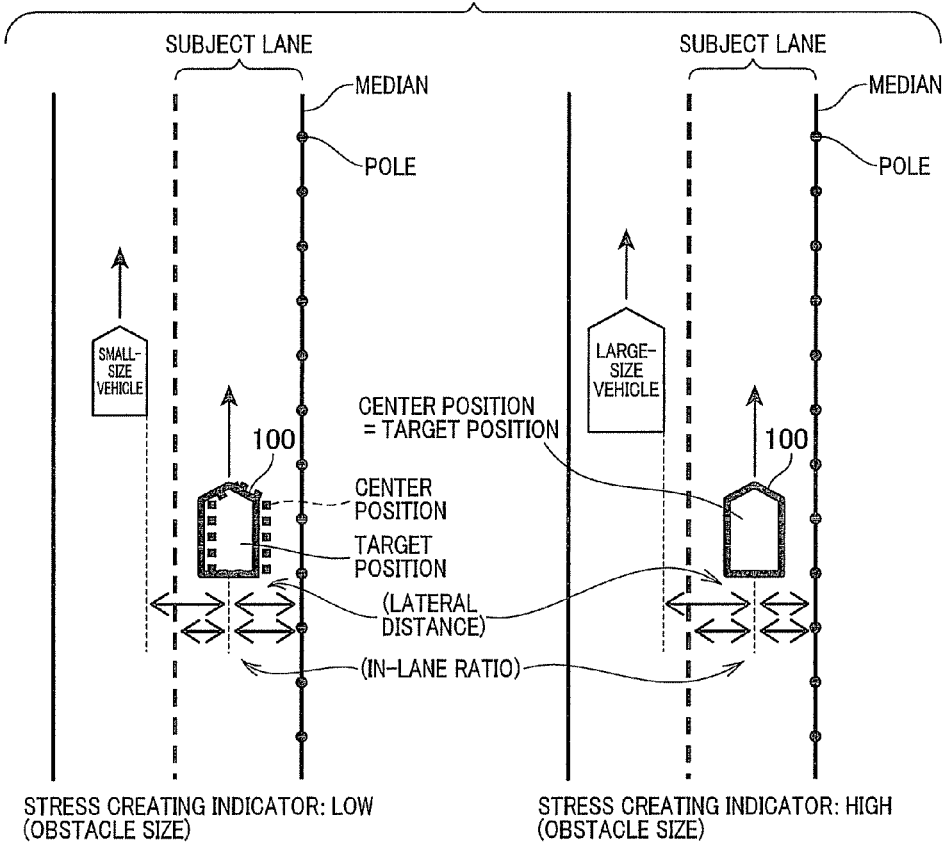
FIG. 17 is an explanatory diagram of examples of a relationship between off-lane conditions and a setting state of the in-lane ratio.

According to the seventh embodiment configured as described above, in a state in which a passing vehicle is present in the lane to the left of the subject lane and projecting objects (median) are present on the right side of the subject lane, when the passing vehicle is a small-size vehicle (having a small stress causing parameter), as shown on the left side in FIG. 17, an ordinary target lateral position (target in-lane ratio) based on the relative position of the off-lane obstacle is set. On the other hand, when the passing vehicle is a large-size vehicle (having a large stress causing parameter), as shown on the right side in FIG. 17, the target lateral position (target in-lane ratio) is set such that the vehicle 100 does not approach the passing vehicle (off-lane obstacle having a large stress causing parameter).

Figure 18:
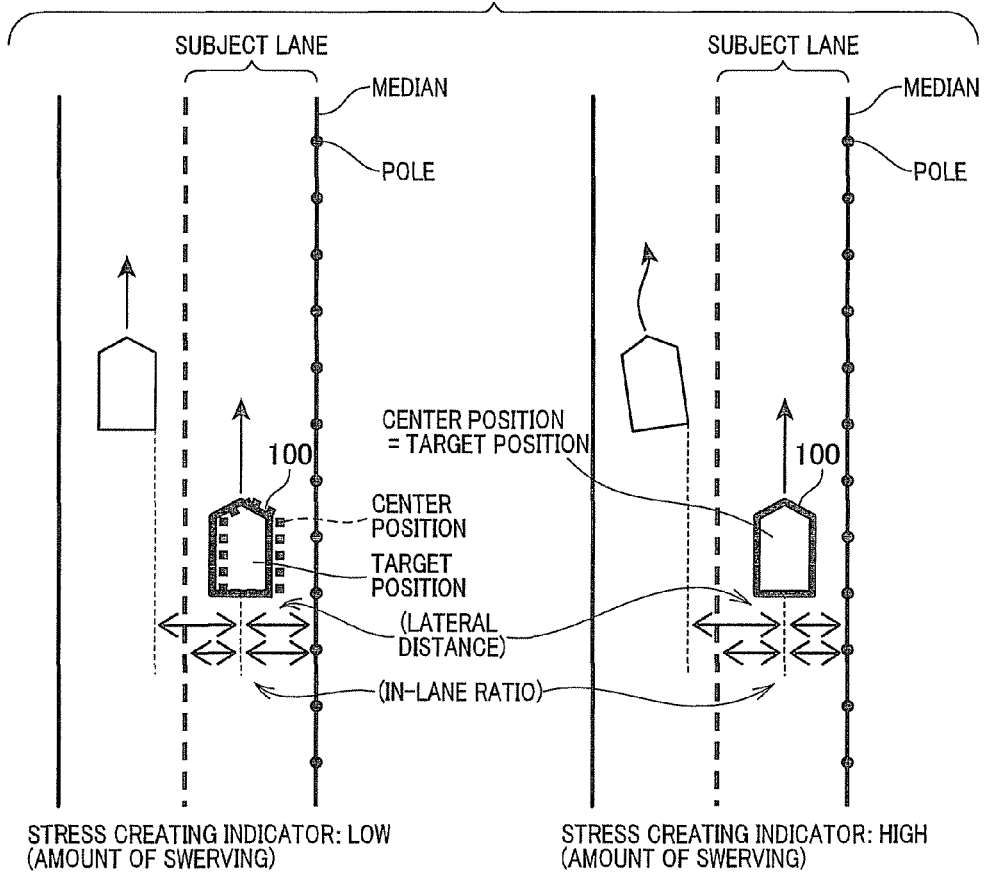
FIG. 18 is an explanatory diagram of examples of a relationship between off-lane conditions and a setting state of the in-lane ratio.

In a similar manner, when the passing vehicle is traveling without swerving (small stress causing parameter), as shown on the left side in FIG. 18, an ordinary target lateral position (target in-lane ratio) based on the relative position of the off-lane obstacle is set. On the other hand, when the amount of swerving of the passing vehicle is large (large stress causing parameter), as shown on the right side in FIG. 18, the target lateral position (target in-lane ratio) is set such that the vehicle 100 does not approach the passing vehicle (off-lane obstacle having a large stress causing parameter).

<Effects>

According to the seventh embodiment described above, an accurate target in-lane ratio can be set based on the possibility of stress being induced in the occupant as a result of the state of the off-lane obstacle. According to the seventh embodiment, the control section 20 performing the processes at S238 and S239 are equivalent to the parameter generating means.

Eighth Embodiment

An eighth embodiment will be described.

<Configuration>

Figure 19:
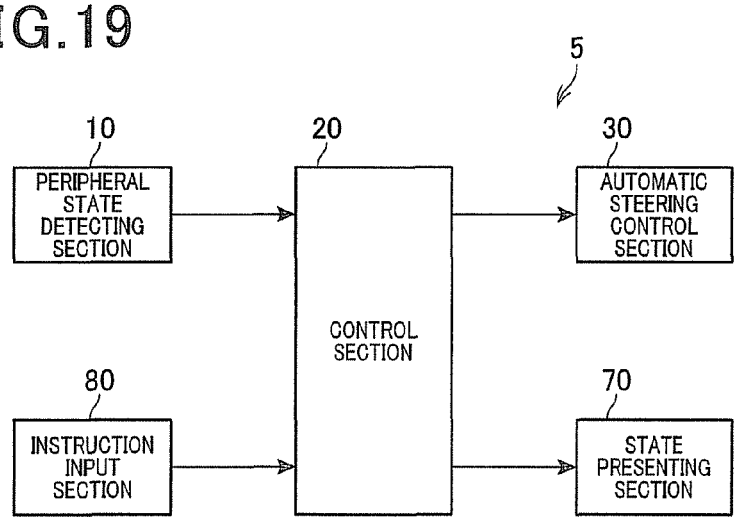
FIG. 19 is a block diagram of a configuration of a vehicle automatic steering control apparatus according to an eighth embodiment.

A vehicle automatic steering control apparatus 5 according to the eighth embodiment, as shown in FIG. 19, includes the peripheral state detecting section 10, the control section 20, and the automatic steering control section 30 in a manner similar to the vehicle automatic steering control apparatus 1. The vehicle automatic steering control apparatus 5 also includes a state presenting section 70 and an instruction input section 80. The state presenting section 70 is used to give notification to the occupant when the in-lane ratio that is the calculation result of the in-lane ratio calculation process changes. The instruction input section 80 is used to input an instruction from the occupant.

The state presenting section 70 is configured by a speaker, a display, a light-emitting member such as a light-emitting diode (LED), a motor, and the like. The state presenting section 70 presents the state using sound, light (images), and vibration. The instruction input section 80 is configured by a switch disposed in a position operable by the occupant. In addition, a part of the lane keeping control performed by the control section 20 differs from that according to the first embodiment. The differing part will mainly be described.

<Lane Keeping Control>

Figure 3:
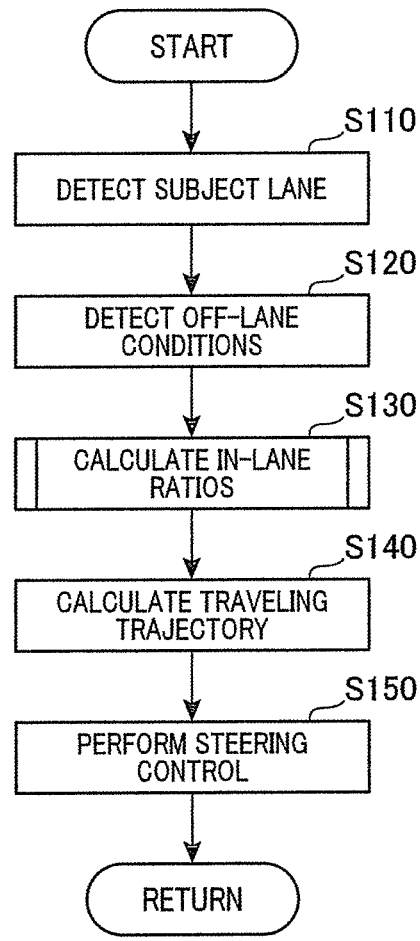
FIG. 3 is a flowchart of the details of lane keeping control according to the first embodiment.

As shown in FIG. 20, in the lane keeping control according to the eighth embodiment, S142 and S144 is added, in comparison with the process shown in FIG. 3.

In other words, at S142 after S110 to S140 are processed, the control section 20 gives notification of the change in in-lane ratio when the in-lane ratio is changed at S130. At this time, the changed traveling trajectory calculated at S140 may be displayed.

At subsequent S144, the control section 20 performs a process to confirm the intentions of the occupant regarding whether or not to allow the change in in-lane ratio. Specifically, the control section 20 gives notification to prompt instruction input regarding whether or not to change the in-lane ratio. The control section 20 waits until an instruction is inputted by the instruction input section 80 or a predetermined amount of time has elapsed. When the instruction allowing the change in the in-lane ratio is inputted or when the predetermined amount of time has elapsed, the control section 20 uses the travel trajectory calculated based on the changed in-lane ratio. When an instruction not allowing the change in in-lane ratio is inputted before the elapse of the predetermined amount of time, the control section 20 uses the traveling trajectory calculated based on the in-lane ratio before change. Then, at S150, the control section 20 performs steering control in adherence to the traveling trajectory used at S144, and ends the lane keeping control process.

<Effects>

As described above, in the vehicle automatic steering control apparatus 5, the in-lane ratio is changed only when the occupant indicates the intention of allowing the change in in-lane ratio. Therefore, steering control (control moving away from the off-lane obstacle that causes stress) unintended by the occupant can be prevented from being performed. According to the eighth embodiment, the state presenting section 70 and the control section 20 performing the process at S142 are equivalent to a state presenting means. The instruction input section 80 and the control section 20 performing the process at S144 are equivalent to an instruction input means.

Other Embodiments

Several embodiments of the present invention are described above. However, the present invention is not limited to the above-described embodiments. Various modifications can be made.

For example, according to the above-described third embodiment, the stress level parameter is used as a condition for performing calculation of the target in-lane ratio. However, the stress sensitivity parameter or the stress causing parameter may be used instead of the stress level parameter.

According to the above-described second, fourth, sixth, and seventh embodiments, any one of the stress level parameter, the stress sensitivity parameter, and the stress causing parameter is used in addition to the relative position to calculate the target in-lane ratio. However, any two or three of the parameters may be used.

According to the above-described eighth embodiment, state presentation (S142) and intention confirmation (S144) are added to the apparatus according to the first embodiment. However, these processes (S142 and S144) may be added to the apparatuses according to the second to seventh embodiments. Furthermore, the two processes are not necessarily required to be performed in combination. A configuration in which intention confirmation (S144) is omitted and only state presentation (S142) is performed may be used.

What is claimed is:

1. A vehicle automatic steering control apparatus, comprising:
   means for detecting a cruising lane in which an own vehicle is traveling;
   means for detecting an obstacle positioned outside of the cruising lane, including a vehicle traveling in an adjacent lane;
   means for determining a relative position of the off-lane obstacle in relation to the own vehicle;
   means for calculating an in-lane ratio expressing the ratio of distances from both left and right edges of the cruising lane at which the own vehicle should travel based on the relative position of the off-lane obstacle;
   means for calculating an expected traveling trajectory on which the own vehicle should travel based on the in-lane ratio;
   means for performing steering control such that the vehicle travels in adherence to the expected traveling trajectory determined by the means for calculating the expected traveling trajectory;
   means for generating at least one of i) a stress level parameter indicating the amount of stress experienced by an occupant in the own vehicle, ii) a stress sensitivity parameter indicating susceptibility stress of the occupant to stress, and iii) a stress causing parameter indicating the probability of stress being induced in the occupant;
   wherein the means for calculating the in-lane ratio calculates the in-lane ratio such that the own vehicle is moved farther away from the off-lane obstacle or prevented from approaching the off-lane obstacle, the greater the parameter generated by the generating means.

2. The vehicle automatic steering control apparatus according to claim 1, wherein the vehicle automatic steering apparatus further includes
   means for storing history information associating the in-lane ratio calculated by the in-lane ratio calculating means and the relative position used to calculate the in-lane ratio; and
   means for reading out, from the storing means, the in-lane ratio associated with the relative position based on the relative position determined by the determining means;
   wherein the means for calculating the expected traveling trajectory performs calculation using the in-lane ratio read out from the storing when the in-lane ratio associated with the relative position determined by the determining means is stored in the storing means.

3. The vehicle automatic steering control apparatus according to claim 2, wherein the vehicle automatic steering apparatus further includes means for estimating an eye-level height of the occupant from vehicle information related to the height of the own vehicle, and the generating means uses the estimated by the eye-level height estimating means as the stress sensitivity parameter.

4. The vehicle automatic steering control apparatus according to claim 3, wherein the vehicle automatic steering apparatus further includes means for detecting at least the speed or the acceleration of the own vehicle, and the generating means generates the stress sensitivity parameter based on the detection result from the means for detecting at least the speed or the acceleration of the own vehicle.

5. The vehicle automatic steering control apparatus according to claim 4, wherein the generating means generates the stress causing parameter for each obstacle detected by the means for detecting the obstacle, and the means for calculating the in-lane ratio calculates the in-lane ratio such that the own vehicle moves away from or is prevented from approaching the off-lane obstacle having the greater stress causing parameter.

6. The vehicle automatic steering control apparatus according to claim 5, wherein the vehicle automatic steering apparatus further includes means for presenting the calculation result by the means for calculating the in-lane ratio to the occupant.

7. The vehicle automatic steering control apparatus according to claim 6, wherein the vehicle automatic steering apparatus further includes means for receiving instruction input regarding whether or not the driver will use the in-lane ratio calculated by the means for calculating the in-lane ratio,
wherein the means for calculating the expected traveling trajectory changes the in-lane ratio used to calculate the expected traveling trajectory based on the content of the instruction from the receiving means.

8. The vehicle automatic steering control apparatus according to claim 1, wherein the vehicle automatic steering apparatus further includes means for estimating an eye-level height of the occupant from vehicle information related to the height of the own vehicle, and the generating means uses the estimated by the eye-level height estimating means as the stress sensitivity parameter.

9. The vehicle automatic steering control apparatus according to claim 1, wherein the vehicle automatic steering apparatus further includes means for detecting at least the speed or the acceleration of the own vehicle, and the generating means generates the stress sensitivity parameter based on the detection result from the means for detecting at least the speed or the acceleration of the own vehicle.

10. The vehicle automatic steering control apparatus according to claim 1, wherein the generating means generates the stress causing parameter for each obstacle detected by the means for detecting the obstacle, and the means for calculating the in-lane ratio calculates the in-lane ratio such that the own vehicle moves away from or is prevented from approaching the off-lane obstacle having the greater stress causing parameter.

11. A vehicle automatic steering control apparatus, comprising:
means for detecting a cruising lane in which an own vehicle is traveling;
means for detecting an obstacle positioned outside of the cruising lane, including a vehicle traveling in an adjacent lane;
means for determining a relative position of the off-lane obstacle in relation to the own vehicle;
means for calculating an in-lane ratio expressing the ratio of distances from both left and right edges of the cruising lane at which the own vehicle should travel based on the relative position of the off-lane obstacle;
means for calculating an expected traveling trajectory on which the own vehicle should travel based on the in-lane ratio;
means for performing steering control such that the vehicle travels in adherence to the expected traveling trajectory determined by the means for calculating the expected traveling trajectory;
means for generating at least one of i) a stress level parameter indicating the amount of stress experienced by an occupant in the own vehicle, ii) a stress sensitivity parameter indicating susceptibility of the occupant to stress, and iii) a stress causing parameter indicating the possibility of stress being induced in the occupant;
wherein the means for calculating the in-lane ratio operates when the parameter generated by the generating means is a threshold value set in advance or greater.

12. The vehicle automatic steering control apparatus according to claim 11, wherein the vehicle automatic steering apparatus further includes
means for storing history information associating the in-lane ratio calculated by the means for calculating the in-lane ratio and the relative position used to calculate the in-lane ratio; and
means for reading out, from the storing means, the in-lane ratio associated with the relative position based on the relative position determined by the determining means;
wherein the traveling means for calculating the expected traveling trajectory performs calculation using the in-lane ratio read out from the storing means when the in-lane ratio associated with the relative position determined by the determining means is stored in the storing means.

13. The vehicle automatic steering control apparatus according to claim 11, wherein the means for calculating the in-lane ratio calculates the in-lane ratio such that the own vehicle is moved farther away from the off-lane obstacle or prevented from approaching the off-lane obstacle, the greater the parameter generated by the generating means.

14. The vehicle automatic steering control apparatus according to claim 13, wherein the vehicle automatic steering apparatus further includes means for detecting at least the speed or the acceleration of the own vehicle, and the generating means generates the stress sensitivity parameter based on the detection result from the means for detecting at least the speed or acceleration of the own vehicle.

15. The vehicle automatic steering control apparatus according to claim 13, wherein the generating means generates the stress causing parameter for each obstacle detected by the means for detecting the obstacle, and the means for calculating the in-lane ratio calculates the in-lane ratio such that the own vehicle moves away from or is prevented from approaching the off-lane obstacle having the greater stress causing parameter.

16. The vehicle automatic steering control apparatus according to claim 13, wherein the vehicle automatic steering apparatus further includes
means for detecting a biological signal of the occupant, and the generating means generates the stress level parameter based on the biological signal detected by the means for detecting the biological signal.

17. The vehicle automatic steering control apparatus according to claim 13, wherein the vehicle automatic steering apparatus further includes means for estimating an eye-level height of the occupant from vehicle information related to the height of the own vehicle, and the generating means uses the estimated by the eye-level height estimating means as the stress sensitivity parameter.

18. A vehicle automatic steering control apparatus, comprising:
- means for detecting a cruising lane in which an own vehicle is traveling;
- means for detecting an obstacle positioned outside of the cruising lane, including a vehicle traveling in an adjacent lane;
- means for determining a relative position of the off-lane obstacle in relation to the own vehicle;
- means for calculating an in-lane ratio expressing the ratio of distances from both left and right edges of the cruising lane at which the own vehicle should travel based on the relative position of the off-lane obstacle;
- means for calculating an expected traveling trajectory on which the own vehicle should travel based on the in-lane ratio;
- means for performing steering control such that the vehicle travels in adherence to the expected traveling trajectory determined by the means for calculating the expected traveling trajectory;
- wherein the vehicle automatic steering apparatus further includes means for presenting the calculation result by the means for calculating the in-lane ratio to the occupant;
- wherein the vehicle automatic steering apparatus further includes means for receiving instruction input regarding whether or not the driver will use the in-lane ratio calculated by the means for calculating the in-lane ratio,
- wherein the means for calculating the expected traveling trajectory changes the in-lane ratio used to calculate the expected traveling trajectory based on the content of the instruction from the receiving means.

\* \* \* \* \*